No. 640,299. Patented Jan. 2, 1900.
C. L. MERKEL.
MEANS FOR SUPPORTING FRAMES OR BODIES OF VEHICLES.
(Application filed May 8, 1899.)
(No Model.)
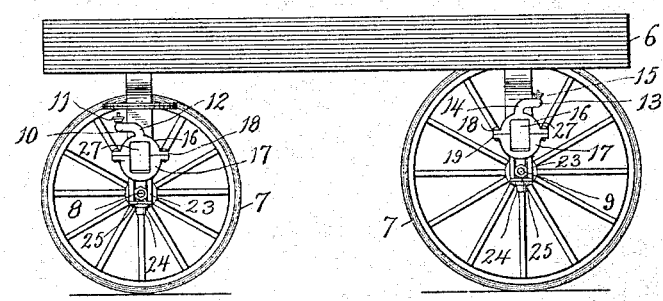
Fig. 1.
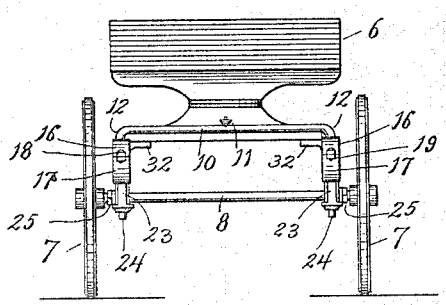
Fig. 2.
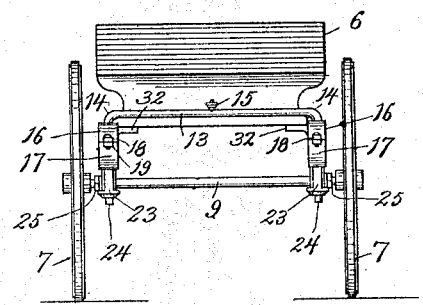
Fig. 3.
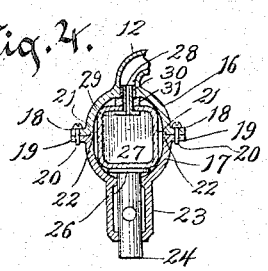
Fig. 4.
Fig. 5.
Witnesses.
O. H. Keeney.
Anna V. Faust.
Inventor.
Charles L. Merkel.
By Benedict & Morsell.
Attorneys.
THE NORRIS PETERS CO., PHOTO-LITHO., WASHINGTON, D. C.

UNITED STATES PATENT OFFICE.

CHARLES L. MERKEL, OF MILWAUKEE, WISCONSIN.

MEANS FOR SUPPORTING FRAMES OR BODIES OF VEHICLES.

SPECIFICATION forming part of Letters Patent No. 640,299, dated January 2, 1900.

Application filed May 8, 1899. Serial No. 715,922. (No model.)

*To all whom it may concern:*

Be it known that I, CHARLES L. MERKEL, of Milwaukee, in the county of Milwaukee and State of Wisconsin, have invented a new and useful Improvement in Means for Supporting the Frames or Bodies of Vehicles, of which the following is a description, reference being had to the accompanying drawings, which are a part of this specification.
My invention has relation to improvements in means for supporting the frames or bodies of vehicles.

The primary object had in view is to provide an improved means for preventing or deadening vibrations or shocks caused by obstacles in or unevenness of the road-bed.

With the above primary object in view the invention consists of the devices and parts or their equivalents, as hereinafter more fully set forth.

In the accompanying drawings, Figure 1 represents a side elevation of a vehicle equipped with my improvements. Fig. 2 is a front end view of Fig. 1. Fig. 3 is a rear end view of Fig. 1. Fig. 4 is a sectional view through the pneumatic cushion and related parts, and Fig. 5 is a detail plan view of the lower portion of the frame or saddle of the pneumatic cushion.

Referring to the drawings, the numeral 6 indicates the body of an ordinary form of vehicle; 7, the wheels thereof; 8, the front axle, and 9 the rear axle.

Extending across the front portion of the vehicle below the body thereof is a tube 10, which is provided with an ordinary form of air-valve mechanism 11, adapted for connection thereto of an air-pump. This tube is bent downwardly at opposite ends to form downwardly-extending tubular branching arms 12 12. A similar transverse tube 13 is provided at the rear of the vehicle, and this tube is likewise bent downwardly at opposite ends to form downwardly-extending branching arms 14 14. The tube 13 is also provided with an ordinary form of air-valve mechanism 15.

At the lower ends of the downwardly-extending tubular arms 12 12 and 14 14 are frames or saddles. Each frame or saddle and its coacting parts are similarly formed, and hence a description of one of said frames and saddles and related parts will suffice for all. Each frame or saddle is preferably composed of two sections, the upper section being indicated by the numeral 16 and the lower section by the numeral 17. The upper section of each frame is integral with or rigidly connected to the end of its downwardly-extending tubular arm. The two sections of the frame may be connected together in any desirable manner, although I prefer to employ the means illustrated in the accompanying drawings, wherein the upper section is shown as provided at its lower end with laterally-extending lugs 18 18 and the upper end of the lower section with corresponding lugs 19 19, which register with and fit the lugs 18, the sets of lugs being secured together by means of screw-bolts 20 20. I also prefer to provide the upper section with interior shoulders 21 21 and the lower section with similar shoulders 22 22, said shoulders fitting together, and thereby effecting a tight joint. The opposite sides of the two sections of each frame or saddle are cut out to form openings in order to secure as much lightness as possible.

While I prefer to provide a frame composed of two sections, as above described and as shown in the accompanying drawings, yet I do not wish to be understood as limiting myself to that particular construction, inasmuch as the frame may be made in one part without departing from the spirit and scope of my invention. Projecting downwardly from the lower end of the lower section 17 is an extension 23, having an opening in its lower end and also provided on its sides with elongated openings. Within the extension 23 is an arm 24, said arm extending upwardly and loosely through an opening in the bottom of the lower section 17 of the frame or saddle and also extending downwardly and loosely through the opening in the lower end of the extension 23. The ends of each axle pass through the elongated openings in the sides of the extensions 23 and also through the openings in the arms 24. Nuts 25 may be turned on threaded portions of the axle against the outer sides of the extension 23. The arm 24 is provided at its upper end with a stirrup or plate 26. Located in each frame or saddle and resting upon the stirrup or plate 26 is an air-cushion 27, advisably of rubber or like material. Each cushion has a tube 28 extending from its upper end, and each tube is preferably of metal and threaded exteriorly, the tube passing through an opening in the upper side of the cushion and formed on its lower end with a plate or enlargement 29, which bears against the under side of the top of the cushion. The upper end of this tube engages a threaded opening in a plate 30, thereby establishing free communication from the transverse tube to the interior of the cushion. A nut 31 turns on the threaded tube 28 between the under side of the plate 30 and the upper side of the cushion, and thereby prevents the tube from dropping into the cushion.

It is obvious that when a pump is applied to the valve mechanism of either the front tube 10 or the rear tube 13 and said pump operated air will be forced through the transverse tube and into the cushions, whereby said cushions will be simultaneously inflated and caused to press firmly against the stirrups 26.

In the illustration of my invention I have omitted to show the ordinary springs which usually support the wagon or vehicle body. My invention makes it possible to dispense entirely with such springs; but it will be understood that, if preferred, said springs may be employed in connection with my supporting mechanism and desirable results obtained.

In the drawings I have shown the front and rear wheels provided with the ordinary flat bands or non-elastic tires. It is obvious that when the air-cushions are inflated in the manner previously pointed out all the desirable features of pneumatic tires are secured owing to the resiliency and give afforded by said air-cushions. If preferred, however, vehicles provided with my improvements may have the wheels thereof equipped with cushion-tires, and in such case the very best results in easy and smooth riding are obtained.

It is obvious that with my improved construction in case any obstruction is passed over in the roadway a give is necessarily provided, which relieves the vehicle of all jar and jolt.

While in the drawings I have shown the valve mechanism as applied to the front and rear transverse tubes which lead to the frames or saddles, so that when a pump is connected to the valve mechanism both air-cushions at one end of the vehicle can be inflated at the same time, yet I do not wish to be understood as limiting myself to this particular disposition of said valve mechanism, inasmuch as the front and rear transverse tubes may be omitted altogether and separate valve mechanism may extend to the frames or saddles or connect with the cushions in any desirable manner.

While I have shown the frames or saddles of a substantially oval form, yet I do not wish to be understood as limiting myself to this particular formation, inasmuch as the frames or saddles may be of any other desirable and convenient shape—as, for instance, of cylindrical form.

It will be seen that the upper sections 16 of the saddles are formed or provided with inwardly-extending arms 32. These arms form a support for the body or frame of the vehicle, and said body or frame may be either connected directly to said arms or the bolsters of the body or frame may be connected thereto.

What I claim as my invention is—

1. The combination, of a vehicle body or frame, the wheels, and axles therefor, saddles supporting the body or frame, transverse tubes at the front and rear of the vehicle, stirrups mounted on the axle, inflatable cushions interposed between the stirrups and the saddles, respectively, and with which cushions the transverse tubes are connected, and means for supplying an inflating agent to the transverse tubes, and into the inflatable cushions.

2. The combination, of a vehicle body or frame, the wheels, and axles therefor, saddles supporting the body or frame, transverse tubes at the front and rear of the vehicle, stirrups mounted on the axle, inflatable cushions interposed between the stirrups and the saddles, respectively, and tubes connected at their upper ends with the ends of the transverse tubes, and having their lower ends passing through the inflatable cushions, said lower ends of the tubes provided with enlargements bearing against the inner sides of the tubes of the cushions.

3. The combination, of a vehicle body or frame, the wheels, and axles therefor, saddles supporting the body or frame, transverse tubes at the front and rear of the vehicle, stirrups mounted on the axle, inflatable cushions interposed between the stirrups and the saddles, plates at the ends of the transverse tubes, tubes connected at their upper ends to said plates, and having their lower ends passing through the inflatable cushions, said lower ends of the tubes provided with enlargements bearing against the inner sides of the tops of the cushions, and nuts turning on the last-referred-to tubes, and interposed between the plates and the outer sides of the tops of the cushions.

4. The combination, of a vehicle body or frame, the wheels, and axles therefor, saddles supporting the body or frame, each saddle provided with a downwardly-extending slotted extension, arms extending vertically through the downward extensions of the saddles, and to which arms the ends of the axles are connected, said ends of the axles passing through the slots of the downward extensions, stirrups mounted on the arms, and flexible cushions interposed between the saddles and the stirrups, respectively.

In testimony whereof I affix my signature in presence of two witnesses.

CHARLES L. MERKEL.

Witnesses:
A. L. MORSELL,
ANNA V. FAUST.